Jan. 17, 1950     N. A. ATWOOD     2,494,536
RADIO COMMUNICATION GRAPHIC CALCULATOR
Filed March 21, 1947
FIG. 1.
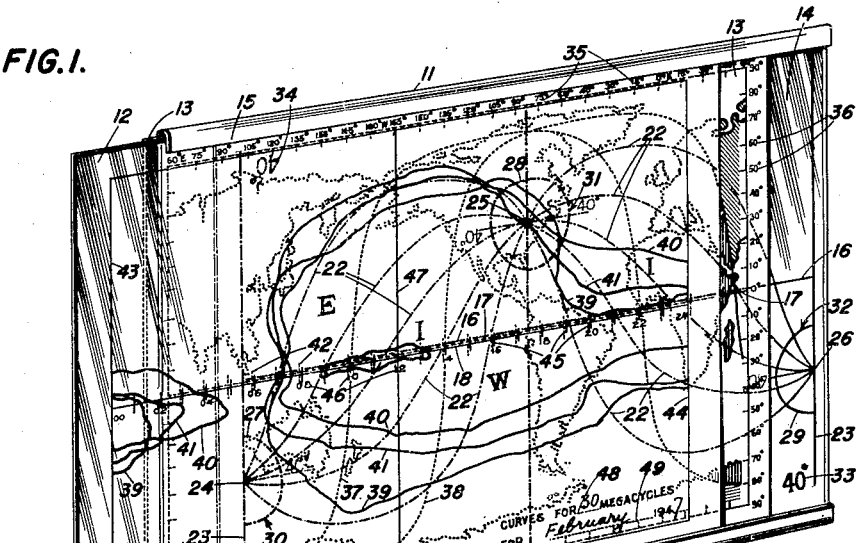
FIG. 2.
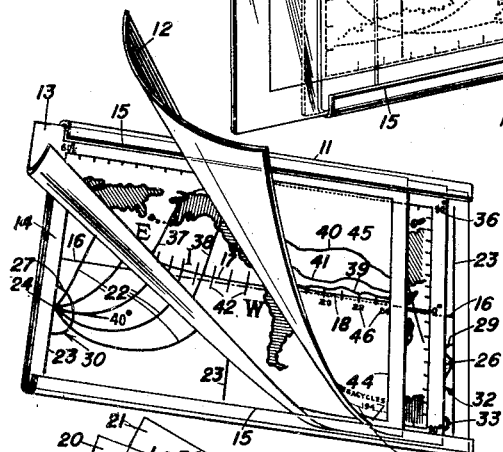
FIG. 4.
FIG. 3.
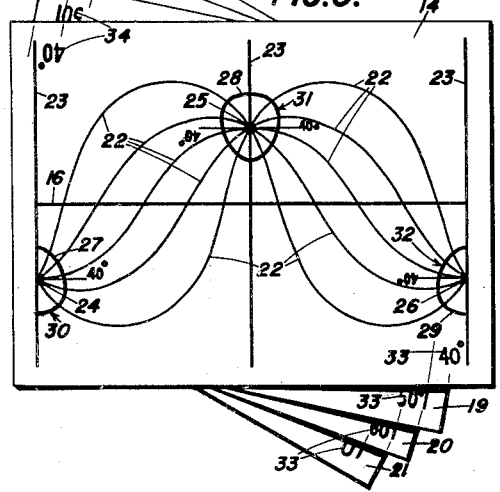
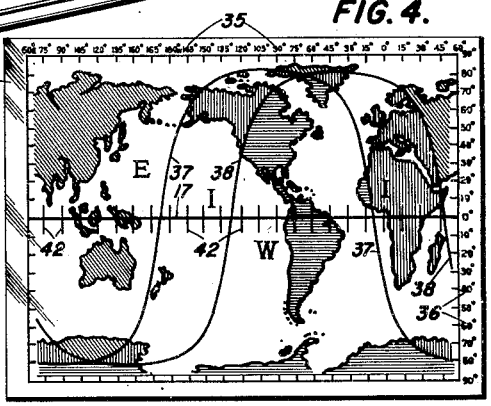
FIG. 5.
INVENTOR
NEWELL A. ATWOOD
BY *D. E. Snyder*
ATTORNEY Patented Jan. 17, 1950

2,494,536

UNITED STATES PATENT OFFICE 2,494,536

RADIO COMMUNICATION GRAPHIC CALCULATOR

Newell A. Atwood, United States Navy, Bethesda, Md.

Application March 21, 1947, Serial No. 736,191

9 Claims. (Cl. 235—89)

(Granted under the act of March 3, 1883, as amended April 30, 1928; 370 O. G. 757)

This invention relates to radio communication and to radio wave propagation. More particularly, this invention relates to determining world areas to and from which radio waves of various frequencies may be transmitted or received at various times of the year, and at various times of the day. This invention also relates to determining optimum radio frequencies for world-wide radio communication. Additionally, this invention relates to determining the azimuthal bearing of radio wave propagation paths between points on the earth's surface, and to determining optimum direction for positioning or beaming of radio antennas.

It is well known that radio signals are reflected from ionospheric layers above the earth to permit radio wave propagation between points widely separated throughout the world. It is also well known that such reflection takes place from various layers of the ionosphere which have come to be designated as the F-layers, the E-layers, and the like. By frequent observations it has recently been determined that reflections from the F-layers of the ionosphere may generally be correlated with the time of the day, the time of the year, and the period of the sunspot cycle. Information is now generally available relative to the maximum usable frequency which may be employed between two locations on the earth's surface. It has been found that, for radio wave propagation or communication over distances in excess of 2500 miles, the maximum usable frequency at two control points along the great circle path between the locations on the earth's surface must be determined and that the least maximum usable frequency of these two is the highest frequency at which communication may be established between these two locations. The control points for such communication consist of a point 1250 miles along the great circle path from the transmitting station toward the receiving station and a similar point 1250 miles toward the transmitting station from the receiving station. By means of charts and data furnished by the Central Radio Propagation Laboratory of the Bureau of Standards, it is possible to determine the maximum usable frequency at each control point and thereby determine the maximum usable frequency for communication between two locations on the earth's surface. Such determinations are made by a series of computations for each hour of the day for the month for which such data is desired, in accordance with the procedure outlined in various publications of the Central Radio Propagation Laboratory.

Heretofore, there has been no simple method by which the various world areas with which communication may be established at a given time of the day on a given frequency, can be determined. Instead, it has been necessary to make a large number of computations, selecting numerous locations throughout the world to determine the maximum usable frequency between the transmitting station and such locations and thereby obtain only incomplete data with respect to world coverage. A separate computation is necessary for each hour of the day and for each control point along the selected path, and there must, of course be many paths selected before an approximate picture of conditions throughout the world can be obtained. The data thus obtained is furthermore expressed in terms of maximum usable frequency, which is often found to be lower than the frequency which it is desired to utilize, thus making the computation only of negative value.

Additionally, it is often necessary in connection with point to point communication to position the radio antenna in such a way that the maximum signal may be transmitted to or received from a foreign point. Unless one has access to great circle charts centered upon the location of the point at which the antenna is located, difficulty is frequently experienced in determining the proper azimuthal bearing for the optimum transmission or reception of radio signals and determining the correct position of the antenna.

It is a purpose of this invention to readily ascertain those areas of the world to and from which radio waves may be propagated by reflection from ionospheric layers. It is a further purpose of this invention to ascertain the radio frequency which may be transmitted to and received from the maximum area of the world's surface at any desired time of day, and if desired, for several months in advance. An additional purpose of this invention is to ascertain the azimuthal bearing of great circle paths between locations on the earth's surface and thereby to determine the direction for positioning or beaming of radio antennae to effect optimum radio wave propagation between such locations. These and other purposes which will be obvious from the following description are accomplished by simple means which readily provide information by inspection instead of by laborious computation.

While the purpose of this invention may be obtained by various means, as will be apparent from the description which follows, a preferred form of the invention is illustrated in the accompanying drawings in which like members represent identical or similar elements, and in which Fig. 1 is a perspective view showing a time-frequency chart, a world map and a great circle chart associated for relative horizontal movement in a holder;

Fig. 2 is another perspective view further illustrating the manner in which the component parts of a preferred embodiment of this invention may be associated for relative movement in a holder;

Fig. 3 is a plan view of several great circle charts for various latitudes, the great circle chart for a latitude of 40° being shown in detail;

Fig. 4 is a plan view of a preferred form of world map; and

Fig. 5 is a plan view of a time-frequency chart upon which has been drawn contour lines for a selected frequency for a selected month.

It has been found that by using, in combination, a time-frequency chart and a world map from which great circle paths about the world may be read, it is possible to accomplish the purposes of this invention. A world map may be used upon which a series of great circle paths from one point upon the earth's surface have been drawn, or a world map may be used in combination with a selected chart showing a series of great circles to ascertain great circle paths. The world map, the time-frequency chart and the great circle chart or any of these may consist of transparent sheets which may be so constructed in size or shape to overlie each other and may be associated such that, by relative movement between these sheets, various relationships between time, frequency, great circle paths and areas or locations on the earth's surface may be ascertained by inspection.

The world map may be constructed on a flat or Mercator projection, or upon a modified Mercator projection, or upon a modified cylindrical projection as may be most convenient. However, the projection used, must correspond to that used for the great circle charts. Likewise, the scale used for the world map must correspond to that used for both the great circle chart and the time-frequency charts. The world map should prominently display the equator line and may, for convenience in ascertaining various locations throughout the world show latitude and longitude designations. This map may also bear indications of the time zones in use throughout the world or in lieu of time zone indications, the world map may show central meridians of time zones, for use in reading time from the time-frequency chart, as will be described below.

The world map may further be divided into zones or sections corresponding to those of the contour lines applied to the time-frequency chart, as will be described below, and such zones may be indicated in any suitable manner such as by representation of land areas in different colors, or by variation in shading or by indication of zone boundaries. While the showing of cities, rivers, and other indicia on the world map is unnecessary, it may be desirable to make such a showing for convenience in ascertaining various locations throughout the world. Additionally, the world map may, if desired, be extended horizontally to show more than 360° in longitude, thus representing certain land areas more than once, for convenience in following great circle paths around the world.

As has been indicated, the world map may contain a series of great circle paths intersecting at one location on the earth's surface. Alternately, great circle charts for each of a number of different latitudes may be used in combination with the world map, each such chart showing an equator line and a series of great circle paths intersecting at points equidistant above and below the equator, the points of intersection on each chart corresponding to a given latitude of the map. For convenience, each great circle path may be shown at regular azimuthal intervals about the selected location or about the point of intersection such as, for example, at thirty degree or forty-five degree intervals. With such a representation, other great circle paths may be interpolated as desired. The world map, or each great circle chart may be transparent, as indicated above, permitting one to overlie the other whereupon, by maintaining the equators of each superimposed, and sliding one along the other, the great circle paths from any location on the earth's surface of the latitude of the great circle chart used, may be ascertained.

Since radio waves are propagated along great circle paths, the world map, associated with such paths from one location, as described above, may be used in accordance with one of the purposes of this invention, to ascertain by inspection the direction in which an antenna should be beamed to effect maximum transmission or reception of radio waves between two locations on the earth's surface.

Because of the intersection of the great circle paths of each chart above and below the equator, a single great circle chart may be used for any point of the same latitude, whether north or south of the equator, and if desired, the great circle chart or the world map may be rotated 180 degrees for added convenience in bringing the intersection of the great circle paths into coincidence with a location of the same latitude upon the world map. Great circle charts may be constructed for one or for a number of latitudes depending upon the variety in latitude of the locations on the earth's surface for which it may be desired to ascertain information relative to radio wave propagation. For example, separate great circle charts may be constructed for the equator and for latitudes of 10° through 70° or higher, at ten degree intervals, thus providing charts from which, for use, one may be selected within five degrees in latitude for any location on the earth's surface; such charts will in general be found to be sufficiently accurate to effect the purposes of this invention.

Upon each great circle path, whether such paths be shown upon the world map or upon great circle charts, control points corresponding to a distance of 1250 miles (or 2000 kilometers) along each path in each direction from the points of intersection of the great circle paths are determined, in accordance with the scale of the world map used, and these control points are connected with a circular line passing through each of said points, to encompass an area 1250 miles in radius about the point of intersection and centered thereupon. This area, hereinafter termed the control area, in conjunction with the world map, is used for obtaining by inspection desired information from the time-frequency chart in the manner to be described below.

The time-frequency chart, used in association with the world map and the great circle paths from some location on said world map may consist primarily of a chart upon which there appears an equator line and a time scale. For convenience in use, the time scale may coincide with the equator, although its position need only be parallel to the equator line and positioned such that it may be read by coincidence with or reference to such time zone indications as have been employed upon the world map, as described above. The time scale may consist of a series of marks representing time of day. These may, for convenience, consist of marks designating each hour of the twenty-four hour day and if desired fractional portions of each hour, with designation of the hours from midnight through noon to midnight reading from left to right. The length of the time scale should be such that each hour thereof corresponds with 15 degrees of longitude along the equator of the world map, the time scale for twenty-four hours corresponding with 360 degrees of longitude along the equator. Upon the time-frequency chart are drawn, for the month for which radio wave propagation information is desired, curves hereinafter termed contour lines, corresponding with the desired frequency as obtained from contour charts of the ionosphere published by various governmental agencies throughout the world, including the Central Radio Propagation Laboratory of the United States Bureau of Standards.

In general, these published contour charts of the ionosphere consist of a series of curves, each representing the maximum frequency which, based upon past observations, may be expected to be reflected from certain layers of the ionosphere from hour to hour of each day during the month for which these curves have been prepared, separate charts showing such curves for the various layers of the ionosphere and for various angles of reflection from these layers. For purposes of this invention, the contour lines drawn upon the time-frequency chart are those corresponding with the curves of the desired frequency as shown by published contour charts for the $F_2$ layer of the ionosphere for 2500 miles (4000 kilometers), such curves representing those portions of the ionosphere which will reflect radio waves of such a frequency to the earth at locations 2500 miles or greater in distance from the location of the origin of such radio waves.

The curves of the published contour charts represent average maximum usable frequencies which may be reflected from the ionosphere, and it has been observed that the optimum working frequencies for reliable radio wave propagation throughout any month are approximately fifteen percent lower than the average maximum frequencies. Accordingly, it may be found advantageous and desirable to draw contour lines upon the time-frequency chart corresponding with frequencies selected from the published contour charts approximately twenty per cent higher than those at which it is desired to ascertain radio wave propagation conditions for world areas. This may be found to be particularly advantageous in connection with the determination of such information for radio communication purposes where regular and reliable communication channels over maximum world areas are desired.

Since, for any given frequency, the curves will vary between several zones of the world, there are published separate contour charts for each such zone. Accordingly, for the purposes of this invention, it is necessary to draw upon the time-frequency chart, for any desired frequency, separate contour lines for each such zone. These contour lines may be designated upon the time-frequency chart in any desirable manner. For example, these contour lines may be in different colors, corresponding with colors which may be employed to designate, upon the world map, land areas falling within various zones, as has been described above. Other means of designating the contour lines for each zone may, of course, be employed.

In drawing contour lines upon the time frequency chart, the relationship between the curves of the contour charts and the time scale shown as a part of such charts must, of course, be maintained. For this reason, and for convenience in drawing the contour lines upon the time-frequency chart it may be found desirable to construct the time-frequency chart, as well as the world map, including the great circle paths, upon the same scale as is used in the published contour charts. The desired contour lines may then be traced or otherwise transferred to the time-frequency chart. However, by means of a pantograph, or by any other suitable means, the contour lines may be transferred to the time-frequency chart on any scale required for use with the world map and the great circle paths associated therewith.

As has been previously pointed out, it has heretofore been possible to determine maximum usable frequency for communication between two locations on the earth's surface, and the published contour charts referred to above have been used for this purpose. However, as has also been pointed out, such determinations have necessitated a large number of computations to obtain data for each hour of the day, the data thus obtained is not in terms of a given frequency, and such data pertains only to propagation between two selected locations. In accordance with this invention, it is now possible to determine at a glance entire world areas to and from which radio waves of a selected frequency may be propagated, and to determine at a glance the times of day during which such propagation may be effected.

The time-frequency chart may advantageously be constructed with a mat finish such that the contour lines for the desired frequency and for the desired month may be drawn thereupon with pencil, thus permitting them to be erased and the chart reused for other frequencies or for other months. The time-frequency chart may also advantageously be provided with some means such as dotted lines with designations wherein the frequency of the contour lines appearing thereupon, and the month for which such lines apply, may be recorded for reference purposes. It will, of course, be obvious that several time-frequency charts may be used with each world-map, including the great circle paths associated therewith, thus permitting radio wave propagation information to be ascertained for various frequencies and for various months by choice of the proper time-frequency chart.

Likewise, of course, where separate great circle charts are provided, as described above, radio wave propagation information for locations at various longitudes and latitudes may be ascertained while using one world map and a time-frequency chart constructed in accordance with the foregoing description.

The time-frequency chart, or the world-map, including the great circle path indications, as described above, may be transparent permitting one to overlie the other or others, whereupon, by maintaining the equators of each superimposed, and sliding one along the other or others, the contour lines of the time-frequency chart will first intersect, then encompass and thereafter pass out of contact with the control area. Time is read from the time scale and its intersection with time zone reference points along the equator, as described above; the reference point nearest in longitude to that of the location of the center of the control area representing local standard time for such a location, as read from the time scale. The time at which the contour line, for the zone corresponding to that of the center point of the control area, first intersects the control area, is the time at which radio waves of the frequency corresponding to the contour lines of the time-frequency chart may be first reflected from the $F_2$ layer of the ionosphere to or from locations 2500 miles or beyond along the great circle path entering the control area at that point of intersection. Likewise, the time at which the proper contour line passes out of contact with the control area, as the charts are moved relative to each other with their equator lines being maintained adjacent to each other, may be ascertained and this will correspond with the time after which radio waves of the chosen frequency will no longer be reflected from the $F_2$ layer to or from locations 2500 miles or beyond along the great circle path entering the control area at the last point of intersection of the contour line with the control area. Between these times, it will be obvious that the times at which great circle paths become "activated" for radio wave propagation may be easily ascertained by determining the times at which such great circle paths enter the control area at points enclosed by the proper contour line of the time-frequency charts.

The world areas to and from which radio waves may be propagated at the chosen frequency along the great circle paths which have been "activated" are easily determined as those falling within the contour lines for the zones in which they are located and lying along these great circle paths, including those world areas 1250 miles along these paths beyond the contour lines, the latter being included since radio waves reflected from the ionosphere, as represented by the contour lines, will reach locations on the earth's surface 1250 miles further along the great circle path.

The time after which radio waves are no longer reflected to certain world areas may be read from the time scale when the relative movement of the chart discloses that such world areas are further removed from the proper contour line for such areas by more than 1250 miles. This distance may be approximated by reference to the azimuthal radius of the control area for locations of similar latitude.

The time-frequency chart and the world-map, as well as separate great circle charts if provided, may advantageously be maintained in association with each other for relative movement, by any desired means. For example, a holder may be provided of approximately the same size as the time-frequency chart, the world-map and the great circle charts, so constructed as to permit only horizontal movement of these components while retaining them in such a position that the equator lines of each are always adjacent, important in connection with satisfactory operation of the device. Inasmuch as it may be desirable to occasionally rotate one of the component parts 180°, as described above, it will be obvious that, for use with a holder, the time-frequency chart, the world chart and the great circle charts should be constructed such that the equator line of each is equidistant from the top and bottom edges of each in order that the equator lines of each will be adjacent regardless of such rotation. The holder, if desired, may be made of transparent material permitting the complete enclosure of the remaining component parts and permitting the inclusion if desired of such material as instructions for use of the device or other material found of value in connection with the use of the device.

The invention having been described in general terms, reference is now made to the drawings which illustrate one form of the invention and which are not to be considered as limiting of the invention in any manner.

In the perspective views, Figs. 1 and 2, there is illustrated a holder 11 containing as inserts a time frequency chart 12 shown in solid lines, a world map 13 shown in dotted lines and at least one great circle chart 14 shown in chain lines, associated for relative movement in a horizontal direction only. The holder 11, which may be constructed of opaque or transparent material is illustrated as having one open face with lips 15 serving to retain the inserts and to form slides in which the inserts may be moved horizontally. If desired, however, the holder 11 may be constructed of transparent material in a manner not shown in the drawings to surround the inserts except at the ends to permit horizontal movement thereof.

The time-frequency chart 12 and the world map 13 are illustrated as sheets of transparent material through which the great circle chart 14 may be viewed. As illustrated in Figs. 3, 4 and 5, upon the great circle chart 14, the world map 13 and the time-frequency chart 12, are equator lines 16, 17 and 18 respectively, which are shown to be positioned adjacent to each other in Figs. 1 and 2.

Fig. 3 illustrates a great circle chart 14 constructed for a latitude of 40°, and additional great circle charts 19, 20 and 21, constructed for latitudes of 50°, 60° and 0°, respectively. It will be understood of course that, in accordance with the foregoing description, a series of great circle charts may be provided, each such chart being constructed for any desired latitude. If desired, certain of these charts may be constructed on the reverse side of others of these charts. All such great circle charts are constructed to show, as more clearly depicted by the forty degree great circle chart 14, a series of great circle paths 22 and 23 intersecting at points 24, 25 and 26, these points being perpendicularly equidistant from equator line 16, with points 24 and 26 being horizontally displaced from point 25 180 degrees in longitude as determined by the scale of world map 13. The vertical line 23 extending perpendicularly to the equator line 16 will be recognized as a great circle path, the azimuthal bearing of which, around points 24, 25 and 26, is 0° or 180° with respect to the equator. Circular lines 27, 28 and 29 surrounding the points of convergence 24, 25 and 26 of great circle paths 22 and 23 outline control areas 30, 31 and 32 respectively, every point on the circular lines 27, 28 and 29 being 1250 miles in distance from the convergence points 24, 25 and 26, respectively.

Latitude designations 34 and 33 are shown in the upper lefthand and the lower right-hand corner of each of the great circle charts 14, 19, 20 and 21 and are provided for convenience in selecting and using the desired great circle chart. For example, while great circle chart 14 of Fig. 3 is illustrated with convergence points 24 and 26 below the equator and convergence point 25 above the equator, it will be apparent that the great circle charts may be rotated 180 degrees if desired, for use in association with the world map 13 and the time frequency chart 12, thus positioning the convergence points 24 and 26 above the equator and the convergence point 25 below the equator.

Fig. 4 illustrates a world map 13 of a modified cylindrical projection exemplary of the type of world map found most convenient for use in accordance with this invention. The world map is constructed with equator line 17 drawn as a heavy line for use in properly positioning the world map with the great circle paths and the time frequency chart. The equator line 17 is also positioned equidistant from the top and bottom edges of world map to assist in properly positioning this map when used in holder 11.

Longitude designations 35 and latitude designations 36 may be applied to the world map as illustrated to assist in ascertaining locations thereupon at which it is desired to center the convergence points 24, 25 or 26 of the control areas 30, 31 or 32, as shown on Fig. 3.

The world map 13 of Fig. 4 bears zone marking lines 37 and 38 separating the areas of the world into the three zones designated by the letters E, I and W, which zones correspond with those for which contour lines 39, 40 and 41 appear on time frequency chart 12 as shown in Fig. 5. The land areas of the world map 13 may, if desired, be shown in colors as illustrated by the shading of Fig. 4, separate colors, corresponding to those of the frequency contour lines 39, 40 and 41, being used for the land areas in each zone.

The world map 13 is also provided with time zone indications such as, for example, central time zone meridians 42 as shown in Fig. 4. Alternatively, time zones may be shown by drawing in the boundary meridians of such zones, not illustrated in the drawings, where it is desired to obtain more accurate information with respect to local time in each zone.

In Fig. 5, the time-frequency chart 12 is illustrated having a vertical border 43 and 44 spaced apart a distance equal to 360° of longitude along the equator 17 of world map 13, which distance is also equal to that between convergence points 24 and 26 of great circle chart 14. Equator line 18 of time frequency chart 12 is centered equidistant from the top and bottom edges of the time frequency chart for the purpose of properly positioning this chart in association with the great circle chart 14 and world map 13 such that the equator lines are adjacent when used with holder 11. Between borders 43 and 44 of time frequency chart 12 is shown a time scale 45 dividing this distance into 24 sections each corresponding with one hour in time. Fractional portions of an hour may be included in the time scale if desired, although as illustrated in Fig. 5, fractional portions of hours are not shown. Hour designations 46 may be applied to the time scale 45 of time frequency chart 12 as illustrated in Fig. 5. A vertical line 47 perpendicular to the equator line 18 and midway between the borders 43 and 44 may be provided as illustrated for convenience in ascertaining the noon meridian of local time.

The time frequency chart 12 may preferably be constructed of such material as will provide a mat finish in order that frequency contour lines 39, 40 and 41 may be drawn thereupon in pencil. The time frequency chart 12 may thus be used many times by erasing the contour lines for a given frequency or for a certain month and drawing in additional contour lines for other frequencies or for other months. To assist in identifying the contour lines 39, 40 and 41 which are drawn upon the time frequency chart 12, there may be provided, as illustrated in Fig. 5, dotted lines 48 and 49 in which may be entered the frequency of the contour lines and the month for which such lines apply.

Fig. 1 not only illustrates the manner in which the component parts of one device embodying this invention are associated, but also illustrates the use of such a device. The chart 14, showing great circle paths intersecting at a latitude of 40°, is positioned in relation to the world map 13 such that a convergence point for the great circle paths thereupon coincides approximately with the longitude and latitude of Columbus, Ohio, 83° west, 40° north.

The time-frequency chart 12, with contour lines 39, 40 and 41 drawn thereupon for a frequency of 30 megacycles for the month of February 1947, is illustrated as positioned with respect to the world map 13 such that time may be read as 1700, or 5 p. m., from the time scale 45 of the time-frequency chart 12 by reference to the central time zone meridian 42 of the world map corresponding with the local time in Columbus, Ohio, i. e., the 90° W. meridian. It is, therefore, evident by inspection that at 5 p. m. during February of 1947, radio signals might normally be expected to be propagated by reflection from the $F_2$ layer of the ionosphere between Columbus, Ohio, and most of Australia (as determined by contour line 39), the central Pacific Islands (as determined by contour lines 39 and 40), central and northern South America (as determined by contour line 41), and certain other areas falling within, or not more than 1250 miles along great circle paths beyond, the contour lines 39, 40 and 41. Radio propagation cannot normally be expected at this time between Columbus, Ohio, and such land areas as Japan, New Zealand, and portions of South Africa, even though these land areas fall within the contour lines 39, 40 and 41, respectively, since great circle paths 22 between these land areas and Columbus, Ohio, do not intersect the control area 28 surrounding Columbus, Ohio, at a point falling within contour line 41.

It will be appreciated that the description provided above in connection with Figs. 1 to 5 is exemplary only and that many variations not illustrated, may be provided within the broad concept of this invention.

As has been pointed out above, the contour lines which are employed in accordance with this invention represent the maximum frequency within each zone which may be expected to be reflected from certain layers of the ionosphere based upon past observations. As such, they represent predicted values, and for this reason, actual propagation may at times not correspond with the predictions obtained in the manner described above. Ionospheric storms, sunspot activity, presence of other layers of the ionosphere, and other factors may result in actual observations differing from predictions obtained in accordance with this invention. However, in general, it will be found that radio wave propagation conditions can be determined fairly accurately in advance by the method and with the means described above.

Many uses for this invention will be apparent to those skilled in the art. For example, this invention may be used by high frequency broadcast stations to determine world coverage for programming purposes, by commercial communication stations to determine optimum transmitting and receiving frequencies, by radio amateurs to determine optimum hours of operation for long distance contacts on amateur frequencies, by research workers and engineers in connection with studies of the ionosphere and studies of wave propagation problems such as radio communication interference problems—and by radio listeners as an aid in selection of short-wave frequency bands and in selection of hours for tuning in of short-wave broadcast stations.

While various novel features of this invention have been shown, described and set forth in the specification and annexed claims, it will be understood that various omissions, substitutions and changes in such features may be made by those skilled in the art without departing from the spirit of the invention.

The invention herein described may be manufactured and used by or for the Government of the United States of America for governmental purposes without the payment of any royalties thereon or therefor.

I claim:

1. Means for determining paths for radio wave propagation comprising in combination a world map having thereupon a reference line, and a great circle chart having thereupon a reference line and a series of great circle paths converging at a common point, said map and chart being movable with respect to one another for positioning of the convergence point of said great circle chart at some desired location on said map, and associated such that said reference lines are maintained adjacent during relative movement therebetween.

2. Means for determining radio wave propagation conditions comprising in combination a time-frequency chart having frequency contour lines thereupon, and a world map having curves indicating great circle paths associated therewith, said map and chart being movable with respect to one another for positioning of different portions of said map adjacent to portions of the time-frequency chart enclosed within said frequency contour lines.

3. Means for determining radio wave propagation conditions comprising in combination a transparent time-frequency chart having a mat-finish surface thereupon to permit the application of frequency contour lines thereto, and a world map having curves indicating great circle paths associated therewith, said map and chart being movable with respect to one another for positioning different portions of said map adjacent to portions of the time-frequency chart outlined thereupon by said application of frequency contour lines thereto.

4. Means for determining radio wave propagation conditions comprising in combination a time-frequency chart having frequency contour lines thereupon, a world map, and a great circle chart having a series of great circle paths thereupon converging at a common point, said map and charts being movable with respect to one another for positioning of the convergence point of said great circle chart at some desired location on said map, and for positioning of different portions of said map adjacent to portions of the time-frequency chart enclosed within said frequency contour lines.

5. Means for determining radio wave propagation conditions comprising in combination a time-frequency chart having frequency contour lines thereupon, a world map, and a great circle chart having a series of great circle paths thereupon converging at a common point, said map and charts being movable with respect to one another for positioning of the convergence point of said great circle chart at some desired location on said map, and for positioning of different portions of said map adjacent to portions of the time frequency chart enclosed within said frequency contour lines, with at least one of said map and charts being transparent.

6. Means for determining radio wave propagation conditions comprising in combination a time-frequency chart having a time scale and frequency contour lines thereupon, a world map having associated therewith curves indicating great circle paths converging at a common point and having thereupon time zone indications, said map and chart being movable with respect to one another for positioning of different portions of said map adjacent to portions of the time-frequency chart enclosed within said frequency contour lines and for determination of time of day corresponding with the relationship of said portions of the world map and time-frequency chart by reference of said time zone indications to said time scale.

7. Means for determining radio wave propagation conditions comprising in combination a time-frequency chart having a time scale and frequency contour lines thereupon, a world map having thereupon time zone indications, and a great circle chart having a series of great circle paths thereupon converging at a common point, said map and charts being movable with respect to one another for positioning of the convergence point of said great circle chart at some desired location on said map, for positioning of different portions of said map adjacent to portions of the time-frequency chart enclosed within said frequency contour lines, and for determination of time of day corresponding with the relationship of said convergence point and said portions of the world map and time frequency chart by reference of said time zone indications to said time scale.

8. Means for determining radio wave propagation conditions comprising in combination a transparent time-frequency chart having a time scale and frequency contour lines thereupon, a transparent world map having thereupon time zone indications, and a great circle chart having a series of great circle paths thereupon converging at a common point, said map and charts being movable with respect to one another for positioning of the convergence point of said great circle chart at some desired location on said map, for positioning of different portions of said map adjacent to portions of the time-frequency chart enclosed within said frequency contour lines, and for determination of time of day corresponding with the relationship of said convergence point and said portions of the world map and time frequency chart by reference of said time zone indications to said time scale.

9. Means for graphically representing radio wave propagation information comprising at least one of a set of charts superimposed upon a world map, said world map and each of said charts having thereupon a reference line for maintaining each of said charts properly superimposed during relative movement over said world map, said set of charts consisting of charts for various latitudes having great circle paths applied thereupon and charts having time scales along the reference lines and frequency contour lines applied thereupon.

NEWELL A. ATWOOD.

No references cited.